Patented June 13, 1950

2,511,812

UNITED STATES PATENT OFFICE 2,511,812

ALKYLSILAHYDROCARBONS

John T. Goodwin, Jr., Pittsburgh, Pa., assignor to Dow Corning Corporation, Midland, Mich., a corporation of Michigan No Drawing. Application April 20, 1948, Serial No. 22,251. In Great Britain July 1, 1947

2 Claims. (Cl. 260—448.2)

The present invention relates to new organosilicon materials.

In the history of the organosilicon compounds, two principal types of compounds containing more than one silicon atom have heretofore been described. In one of these types, the silicon atoms are linked directly to each other. These are the so-called polysilanes heretofore described by Kipping. The present organosilicon industry is based upon the siloxanes which are materials in which the silicon atoms are linked through oxygen atoms. There has been some mention in the literature heretofore of organosilicon halides containing a plurality of silicon atoms in which the silicon atoms are linked by large divalent organic radicals and the remaining valences of the silicon atoms are satisfied by chlorine.

Objects of the present invention are the provision of new compounds which are of general utility industrially.

Compounds in accordance herewith are of the formula $R[SiR_2CH_2]_nSiR_3$ in which R represents alkyl radicals such as methyl to octadecyl and $n$ represents a positive integer.

The compounds hereof are fluids. Those of relatively low molecular weight are distillable. The higher molecular weight materials are generally non-distillable. The thermal stability of the present compounds is comparable to that of siloxanes. The stability of these compounds at high temperature in the presence of steam is substantially better than the stability of siloxanes under equivalent conditions.

The present compounds may be prepared by various methods. Thus compounds of the type $Cl[SiCl_2CH_2]_nSiCl_3$ may be reacted with a Grignard reagent prepared from an alkyl halide, whereby to substitute alkyl radicals for the chlorine atoms.

Likewise these compounds have been prepared by contacting a compound of the type $R_3SiCH_2Cl$ with an alkali metal in the presence of a compound of the type $R_3SiCl$. Where R is methyl, this produces 2,2,4,4 - tetramethyl-2,4 - disilapentane, $(CH_3)_3SiCH_2Si(CH_3)_3$. In order to produce compounds of this type by this general method but in which compounds $n$ is greater than one, a compound of the type $R[SiR_2CH_2]_nCl$ may be substituted for the compound $R_3SiCH_2Cl$. By this method the larger linear compounds have been produced. These general methods are disclosed in my copending applications Serial Nos. 22,253, now Patent 2,507,512 and 22,254, now Patent 2,507,513, filed simultaneously herewith.

The production of the present compounds may be by interacting a compound of the type $$Cl[SiR_2CH_2]_nSiR_2Cl$$

with an alkyl Grignard reagent. The production of this organosilicon chloride is disclosed in my copending application Serial No. 22,252, filed simultaneously herewith.

The compounds hereof are of utility for such purposes as hydrophobing agents, lubricants, hydraulic fluids and the like.

The following examples illustrate the method of the present invention.

*Example 1.*—61 parts by weight of $$(CH_3)_3SiCH_2Cl$$

55 parts of $(CH_3)_3SiCl$ and 100 parts of hexa-decane were placed in a reaction vessel and heated until refluxing occurred. 23 parts by weight of metallic sodium were added slowly in small pieces while stirring the reaction mixture. The reaction proceeded slowly at first due to the low reflux temperature. As the reaction occurred and the reactants were used up, the temperature rose and the reaction rate increased. The products were distilled from the reaction mixture until the boiling point indicated that hexadecane was starting to be distilled. The distillate was redistilled whereby 52 parts of a material boiling at 132.2° C. at 740 mm. were obtained. This material was found to be $$(CH_3)_3SiCH_2Si(CH_3)_3$$

The yield was 63.4 percent. The properties of this product are as follows:

| | Observed | Calculated |
|---|---|---|
| Boiling Point | 132.2° C. at 740 mm | |
| $(n)_d$ | 1.4154 at 25° C | |
| Density | 0.7458 at 25° C | |
| R¹ | 53.77 | 53.80 |
| Percent Si | 34.2 | 35 |
| Percent C | 50.6 | 52.0 |
| C/Si | 3.45 | 3.50 |
| Viscosity | | |

¹ Molar refraction based on paper by E. L. Warrick, JACS 68, 2455 (1946).

*Example 2.*—Eighty-seven parts of 2-ethoxy-2,4,4,6,6-pentamethyl-2,4,6-trisilaheptane were reacted with 65 parts of methyl magnesium bromide in 142 parts of absolute ether. The ether was distilled off through a column and the reactants were heated at 190° C. for 14 hours. Salt was deposited during the heating. The reaction product was poured into an aqueous hydrogen chloride solution and the non-aqueous layer was recovered. This layer was dried, filtered and distilled. The compound obtained was $(CH_3)_3SiCH_2Si(CH_3)_2CH_2Si(CH_3)_3$ and had a boiling point of 208° C. at atmospheric pressure, a freezing point of −64° C. and a density of 0.7990 at 25° C. A 46.4 percent yield was obtained.

*Example 3.*— Eighty parts of 2-ethoxy-2,4,4,6,6,8,8-heptamethyl-2,4,6,8-tetrasilanonane were added to 69 parts of methyl magnesium bromide in 142 parts of absolute ether. The preparation was conducted as in Example 2. An 89 per cent yield of $CH_3[Si(CH_3)_2CH_2]_3Si(CH_3)_3$ was obtained. This product distills at 187° at 19 mm., has a freezing point of −110° and a density of 0.8210 at 25° C.

*Example 4.*—Fifteen parts of $Cl[Si(CH_3)_2CH_2]_4Si(CH_3)_3$ were added to 17 parts of methyl magnesium bromide in 71 parts of absolute ether. The preparation was conducted as in Example 2. A 71 percent yield of $CH_3[Si(CH_3)_2CH_2]_4Si(CH_3)_3$ was obtained. This product had a boiling point of 187° at 19 mm., a freezing point of −95° C. and a density of 0.8386 at 25° C.

That which is claimed is:
1. Compounds of the general formula $R[SiR_2CH_2]_nSiR_3$ in which R represents alkyl and $n$ is a positive integer.
2. Compounds in accordance with claim 1 in which R represents methyl.

JOHN T. GOODWIN, JR.

REFERENCES CITED

The following references are of record in the file of this patent:

UNITED STATES PATENTS

| Number | Name | Date |
|---|---|---|
| 2,352,974 | Rochow | July 4, 1944 |

OTHER REFERENCES

Sommer et al., "Jour. Am. Chem. Soc.," vol. 69, April 1947, page 980, article received March 6, 1947.